United States Patent [19]

Tsurumoto et al.

[11] Patent Number: 4,817,203
[45] Date of Patent: Mar. 28, 1989

[54] REMOTE CONTROL SYSTEM

[75] Inventors: Takashi Tsurumoto, Tokyo; Kunio Nagai, Kanagawa, both of Japan

[73] Assignee: Sony Corporation, Tokyo, Japan

[21] Appl. No.: 55,325

[22] Filed: May 29, 1987

[30] Foreign Application Priority Data

Jun. 2, 1986 [JP] Japan .................................. 61-127590

[51] Int. Cl.⁴ .............................................. H04B 9/00
[52] U.S. Cl. .................................. 455/603; 358/194.1; 455/617
[58] Field of Search ...................... 358/194.1; 455/603, 455/608, 617

[56] References Cited

U.S. PATENT DOCUMENTS

| | | | |
|---|---|---|---|
| 4,337,480 | 6/1982 | Bourassin et al. | 455/603 |
| 4,386,436 | 5/1983 | Kocher et al. | 358/194.1 |
| 4,482,947 | 11/1984 | Zato et al. | 455/603 |
| 4,488,179 | 12/1984 | Kruger et al. | 358/194.1 |
| 4,496,947 | 1/1985 | Nakashima et al. | 358/194.1 |
| 4,539,711 | 9/1985 | Harger | 358/194.1 |

*Primary Examiner*—Robert L. Griffin
*Assistant Examiner*—Leslie Van Beek
*Attorney, Agent, or Firm*—Hill, Van Santen, Steadman & Simpson

[57] ABSTRACT

An electronic appliance, which can facilitate operation of a commander for transmitting a remote control signal for the electronic appliance, includes a receiver for receiving a remote control signal from a commander, a plurality of input terminals for receiving video signals from external signal sources, a signal selection switch for selecting one of the signals received at the input terminals and a broadcast signal and for delivering the selected signal as an output video signal therefrom, a code converter operable in response to the condition of the signal selection switch for converting a signal received at the receiver into a code by which the pertaining signal source can be controlled, and an output terminal for supplying an output of the code converter therefrom to the pertaining signal source via a signal cable.

4 Claims, 1 Drawing Sheet

REMOTE CONTROL SYSTEM

BACKGROUND OF THE INVENTION

This invention relates to an electronic appliance to which one of a plurality of appliances is selectively connected and which is subject to remote control. An embodiment of the invention is preferably used, for example, for a television set to which one of a plurality of video appliances is selectively connected at the video input terminals thereof and which is subject to remote control.

Normally, a VTR (video tape recorder) is connected in most cases to an external video input terminal of a conventional television set for domestic use. In the case of a television set which is remotely controlled using a commander, where a VTR is connected to a video input terminal of the television set, a remote control signal for controlling the VTR is received at a remote control signal receiver of the television set and then transmitted to the VTR.

However, in recent years, novel appliances have been developed and accordingly kinds of appliances which can be connected to a video input terminal of a television set have increased so that, in addition to a VTR, for example, a video camera, an 8 mm video recorder, a video disk player and so on may be connected. Accordingly, television sets having a plurality of video input terminals have also been provided.

FIG. 2 illustrates a system wherein appliances such as a VTR 5, an 8 mm video recorder 6 and a video disk player 7 are connected to a television set 4 which has three video input terminals 1, 2, 3, and those appliances 4, 5, 6, 7 are remotely controlled using a commander 8.

Referring to FIG. 2, the appliances 5, 6, 7 are connected to the video input terminals 1, 2, 3 via connecting lines or cables 9, 10, 11, respectively. The television set 4 includes a remote control signal receiver 12 for receiving an infared ray remote control signal from the commander 0, and a remote control signal received at the signal receiver 12 is then transferred to a control circuit 13 provided in the television set 4 while the remote control signal is transferred also to control circuits 14, 15, 16 provided in the appliances 5, 6, 7, respectively, over a connecting line or cable 17.

The television set 4 further includes an input control circuit 18 and an input switching circuit 19 therein. Signals which are delivered from the appliances 5, 6, 7 via the terminals 1, 2, 3, respectively, are coupled to the input switching circuit 19. Which one of the appliances 5, 6, 7 is selected, that is, which one of the terminals 1, 2, 3 is selected, is determined in response to an external operation of a keyboard or the like associated with the input control 18. Thus, in response to such an external operation, the input control circuit 18 controls the input switching circuit 19 to effect a switching operation to transfer a signal received at one of the terminals 1, 2, 3 of the television set 4 to an image receiving circuit (not shown).

The commander 8 includes various operating keys 20 and a terminal selection switch 21. The selection switch 21 may be in the form of a slide switch having four discrete positions including a position for selection of the television set 4 in which the television set 4 receives a television broadcast in response to a selection by the input switching circuit 19 and three other positions for selection of the three terminals 1, 2, 3. Some of the operating keys 20 are in common for the appliances 4, 5, 6, 7, and when a commonly used operating key 20 is operated, a remote control signal having a code corresponding to a selection, that is, a selected position, of the selection switch 21 is transmitted therefrom. Such commonly used keys include, for example, a channel selection button of a VTR of a television set and a still or pause button of a VTR or a video disk player.

According to the construction described above, in case, for example, the VTR 5 is to be selected via the input control circuit 18 by an external operation, the selection switch 21 of the commander 8 will be shifted to the position for selection of the terminal 1. Then, if an operating key 20 is operated, a remote control signal is transmitted therefrom and is received at the receiver 12. The remote control signal is then transferred to the control circuit 13 while it is delivered also to the control circuit 14 for the VTR 5 over the connecting line 17. Consequently, the VTR 5 is caused to operate in a mode corresponding to the contents of the code of the remote control signal. Thus, in the case of, for example, a reproduction or play mode, a reproduction or play signal is received via the terminal 1 over the connecting line 9 while it is further supplied to the image receiving circuit described above via the input switching circuit 19. Consequently, a reproduced picture image of the VTR 5 can be monitored on the screen of the television set 4.

Also the other 8 mm video recorder 6 or the video disk player 7 can be caused to operate in a desired mode by remote control by a shifting operation of the selection switch 21 to a position corresponding to the terminal 2 or 3.

In the conventional system of FIG. 2, it is necessary to operate the selection switch 21 of the commander 8 each time the input of the terminal 1, 2 or 3 is to be switched. Accordingly, time or labor for such operation is required, and in case an operation of the selection switch 21 is forgotten or effected in error, it is impossible to control the appliances regularly. To the contrary, if the selection switch 21 is omitted, it will be impossible to use some of the operating keys 20 commonly to the appliances 4, 5, 6, 7, and consequently the number of such operating keys 20 will have to be increased for individual kinds of appliances to be connected to the television set 4.

SUMMARY OF THE INVENTION

It is an object of the present invention to provide an electronic appliance which can facilitate operation of a commander for transmitting a remote control signal for the electronic appliance.

According to the present invention, there is provided a television signal processing apparatus for remotely controlling a plurality of external signal sources via a signal cable, comprising: a remote control signal receiver for receiving an infared ray remote control signal from a remote control commander; a plurality of signal input terminals for receiving thereat video signals from said external signal sources; a signal selection switch for selecting one of the signals received at said signal input terminals and a broadcast signal and for delivering the selected signal as an output video signal therefrom; a code converter operable in response to a condition of said signal selection switch for converting a signal received at said remote control signal receiver into a code by which the selected signal source can be controlled; and a remote control signal output terminal for supplying an output of said code converter therefrom to the pertaining signal source via said signal cable. Accordingly, an operation of the special switch for switching the commander for a particular appliance to which the electronic appliance is to be connected can be omitted.

The above and other objects, features and advantages of the present invention will become apparent from the following description and the appended claims, taken in conjunction with the accompanying drawing.

DETAILED DESCRIPTION OF THE PREFERRED EMBODIMENT

Figure 1:
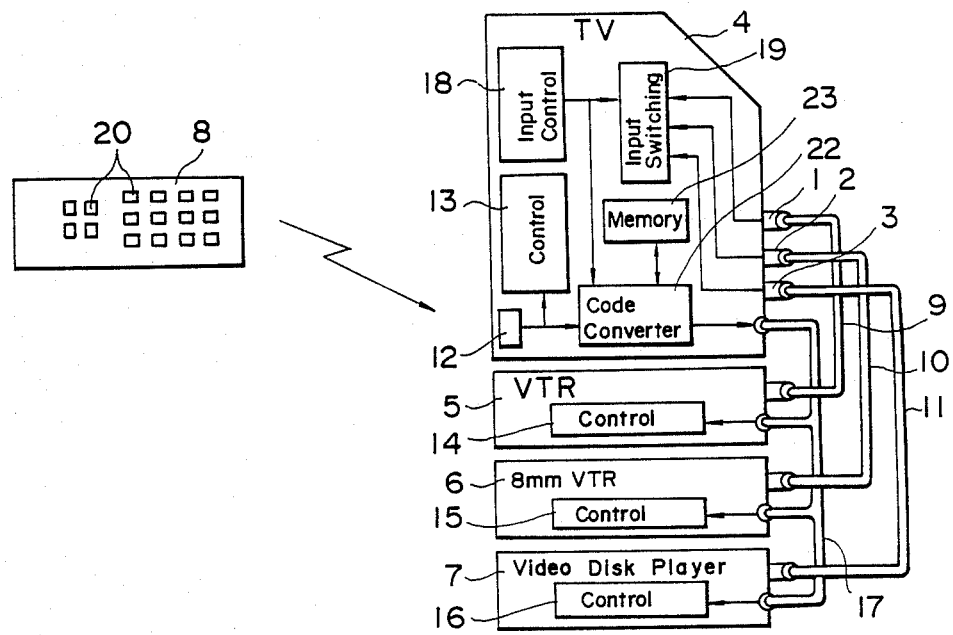
FIG. 1 is a block diagram illustrating an embodiment of an electronic appliance according to the present invention.

Referring to FIG. 1, an embodiment of an electronic appliance according to the present invention is shown. It is to be noted that, in FIG. 1, like parts or components are denoted by like reference numerals to those of FIG. 2 and a detailed description of the same is omitted herein to avoid redundancy.

The embodiment shown in FIG. 1 is in the form of a television set 4 which additionally includes a code converting circuit 22 and a memory 23. Meanwhile, the selection switch 21 of FIG. 2 of the commander 8 is omitted from a commander 8 of FIG. 1.

Thus, the commander 8 of FIG. 1 is constituted such that if one of a plurality of operating keys 20 is operated, a remote control signal having a code corresponding to an individual mode may be delivered therefrom. In this instance, even when one of the operating keys 20 which are used in common to control appliances 4, 5, 6, 7 is operated, a remote control signal of a same code is delivered therefrom irrespective of a selected appliance.

The code converting circuit 22 converts a code of a signal received at a receiver 12 of the television set 4 in response to a switching signal, for controlling the terminal connection developed from an input control circuit 18, by such an external operation as described above. Meanwhile, data necessary for such code conversion as described above are stored in the memory 23.

According to the construction described above, if, for example, the VTR 5 is selected by an external operation, an input switching circuit 19 selects a terminal 1 in response to a switching signal of the input control circuit 18 while the code converting circuit 22 converts a code of a remote control signal received at the receiver 12 into another code by which the VTR 5 can be controlled by control unit 14. Thus, the VTR 5 can be controlled by delivering the control signal after such code conversion to a control circuit 14 of the VTR 5 over a connecting line or bus 17.

With the construction described above, the selection switch 21 of FIG. 2 can be omitted. Accordingly, the time and labor required for operation of the selection switch 21 can be saved without increasing the number of the operating keys 20 of the commander 8, and accordingly operation of the commander 8 can be simplified compared with the conventional system.

While in the present embodiment the television set 4 includes the three video input terminals 1, 2, 3, the present invention can be applied also to a television set which includes a single video input terminal to which one of the appliances 5, 6, 7 is selectively connected. In this instance a control signal after predetermined code conversion can be delivered to a connected appliance by controlling the code converting circuit 22 by the input control circuit 18.

Meanwhile, it is also possible to display which one of the appliances is being used at present on the screen of the television set 4 in response to a switching signal developed from the input control circuit 18.

It is to be noted that while in the embodiment described hereinabove an electronic appliance of the present invention is in the form of a television set which is designed to selectively receive a television broadcast or a signal received at any of signal input terminals thereof, it may alternatively take another form such as, for example, a signal distributing adapter which is provided separately from a television set. In this instance, the signal distributing adapter may include therein a tuner circuit for receiving a television broadcast.

Figure 2:
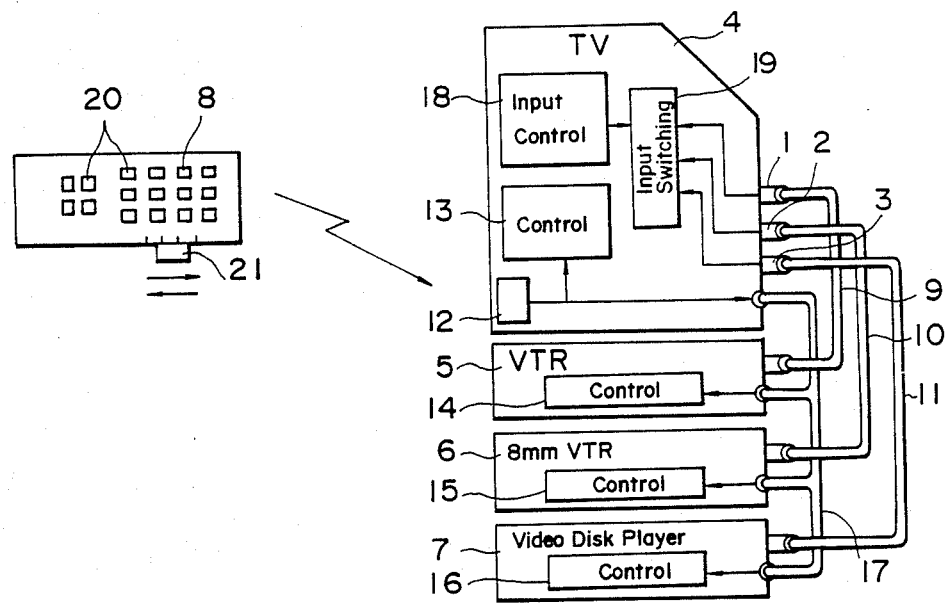
FIG. 2 is a block diagram illustrating a conventional electronic appliance.

As apparent from the foregoing description, according to the present invention, a selection switch such as the selection switch 21 of FIG. 2 which is conventionally provided on a commander can be omitted without increasing the number of operating keys on the commander. Accordingly, operation of the commander can be simplified, and erroneous operation of the selection switch can be eliminated.

Having now fully described the invention, it will be apparent to one of ordinary skill in the art that many changes and modifications can be made thereto without departing from the spirit and scope of the invention as set forth herein.

What is claimed is:

1. A television signal processing apparatus for remotely controlling a plurality of external signal source devices via a signal cable connected to said devices, and for producing a video output signal from a plurality of input video signals from said source devices, comprising:

a source of a broadcast signal;

a plurality of signal input terminals connected to said cable for receiving video signals from said external sources;

a signal selection switch connected to said broadcast source and to said signal input terminals for selecting one of the signals received at said signal input terminal or said broadcast signal and for delivering the selected signal as an output video signal therefrom;

a remote control signal receiver for receiving an infrared remote control signal from a remote control commander, said infrared remote control signal being independent of the condition of said switch;

a code converter connected to said remote control signal receiver and connected to said switch and operable in response to a condition of said switch for converting the signal received at said remote control signal receiver into a code especially adapted to control the external device which is the source of the signal selected by said switch; and a remote control signal output terminal for supplying an output of said code converter to the external device which is the source of said selected signal via said signal cable.

2. A television signal processing apparatus according to claim 1, wherein said television signal processing apparatus is a television set.

3. A television signal processing apparatus according to claim 1, wherein said television processing apparatus is a signal distributing adapter provided separately from a television set.

4. A television signal processing apparatus according to claim 3, wherein said broadcast signal comprises a tuner circuit for receiving a television broadcast.

* * * * *